May 13, 1969     V. G. REILING     3,443,817
TEMPERATURE STABLE SEAL
Original Filed Oct. 11, 1963
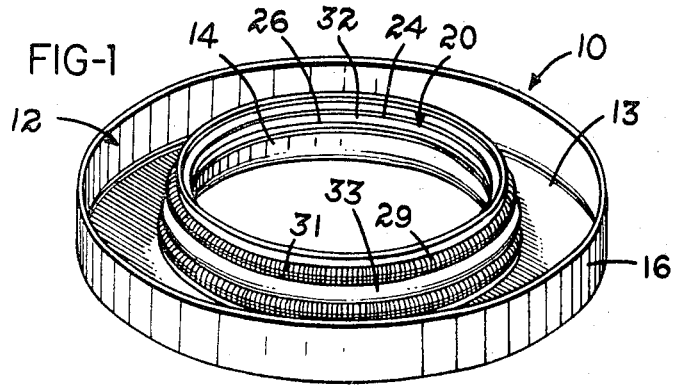
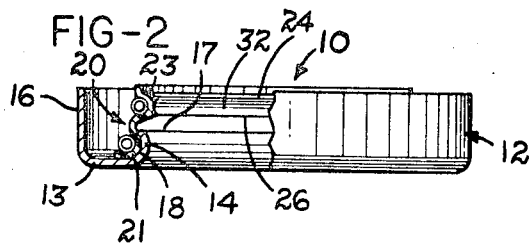
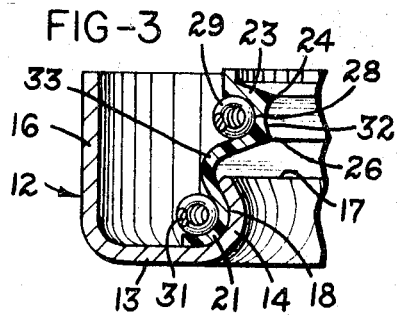
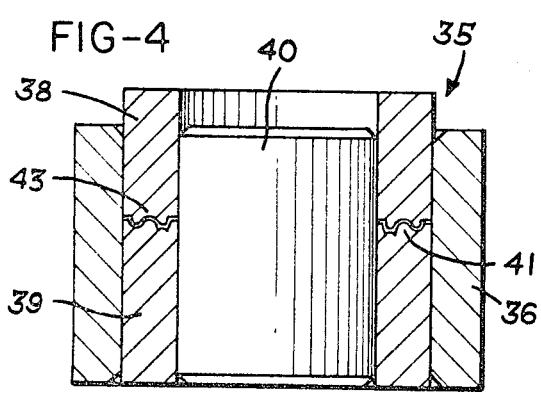
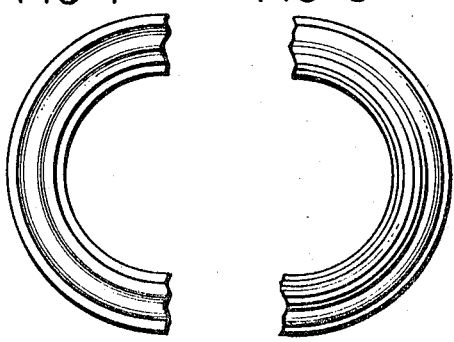
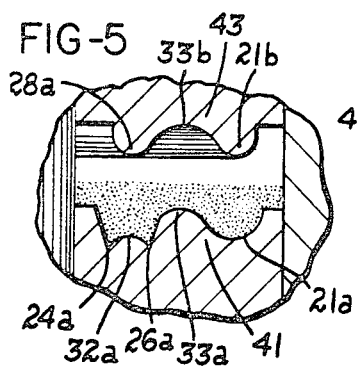
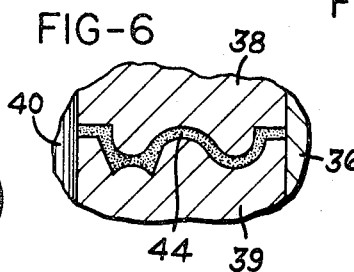
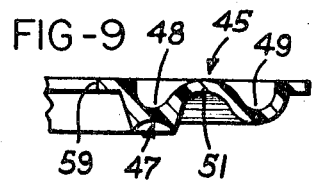
INVENTOR.
VICTOR G. REILING
BY
Marechal, Biebel, French & Bugg
ATTORNEYS

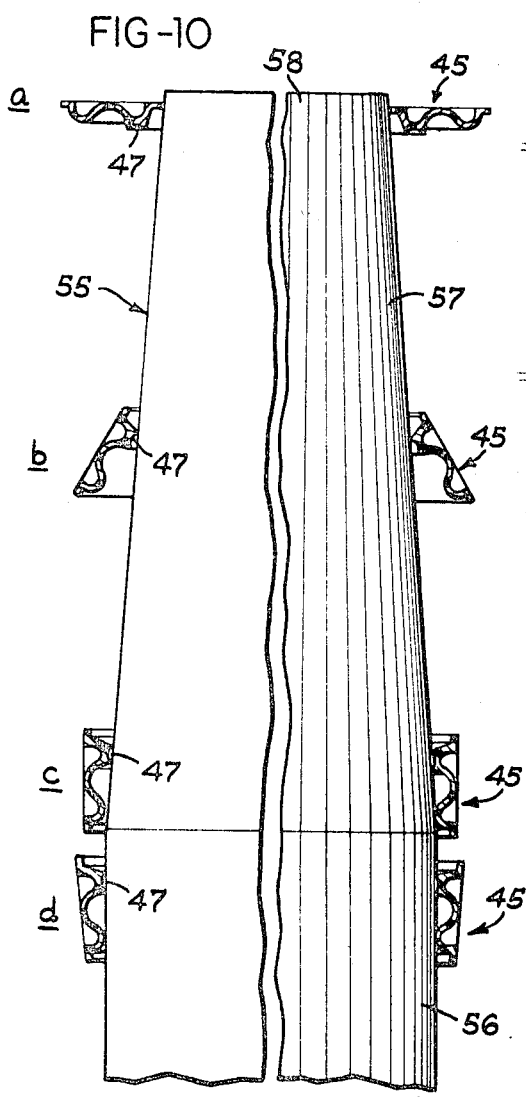
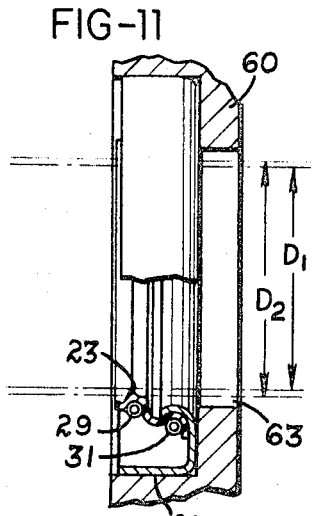
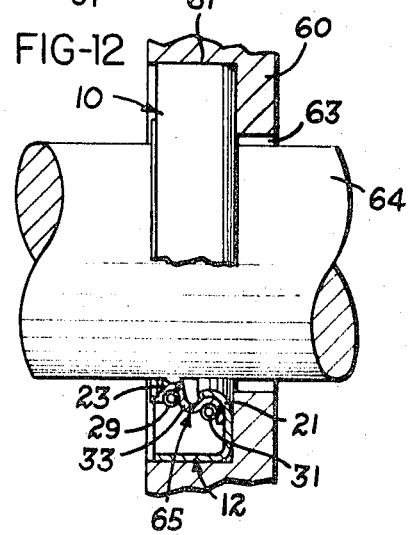
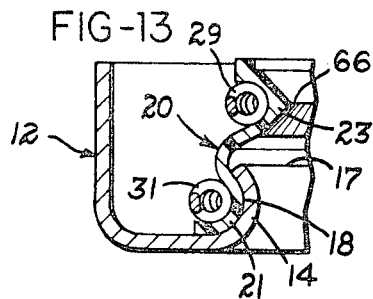
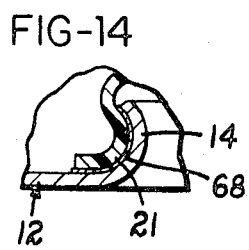
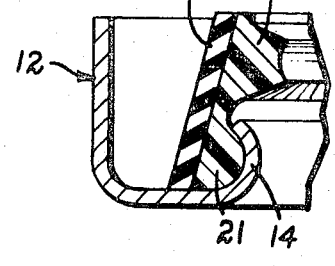
INVENTOR.
VICTOR G. REILING United States Patent Office 3,443,817
Patented May 13, 1969

3,443,817
TEMPERATURE STABLE SEAL
Victor G. Reiling, P.O. Box 2271, Dayton, Ohio 45429
Original application Oct. 11, 1963, Ser. No. 315,642, now Patent No. 3,281,512, dated Oct. 25, 1966. Divided and this application Sept. 6, 1966, Ser. No. 577,365
Int. Cl. F16j 15/32, 9/06; F02f 5/00
U.S. Cl. 277—153                    10 Claims

ABSTRACT OF THE DISCLOSURE

A temperature stable seal assembly includes a seal element of polytetrafluoroethylene having a dynamic seal surface of predetermined configuration, forming a high pressure seal area, and having a primary plastic memory to decrease the deformation thereof in response to increases in temperature. A static seal surface is also provided which rests in a plane different from that of the dynamic seal surface. The dynamic seal surface also possesses a secondary plastic memory tending to urge the high pressure seal area into engagement with the member being sealed in response to increases in temperature. Methods of preparing the seal member and assembly are also disclosed.

Related applications

This application is a division of application Ser. No. 315,642, filed Oct. 11, 1963, and issued on Oct. 25, 1966, as U.S. Patent No. 3,281,512.

The present invention relates to seal assemblies, and more particularly to an improved seal assembly wherein the seal element is of a corrosion resistant plastic material having a low coefficient of friction.

Polytetrafluoroethylene, available commercially under the trademark Teflon inherently possesses a low coefficient of friction and is relatively inert to most chemicals and solvents. Each of these characteristics of this material is desirable from the standpoint of fabrication of seal elements, and a material which possesses both of these characteristics offers definite and important practical advantages with respect to sealing members. There are, however, other properties of this material which raise difficulties in connection with the fabrication, manufacture and use of seal elements composed in part or entirely of polytetrafluoroethylene. While identified as a thermoplastic resin, polytetrafluoroethylene does not behave as a true thermoplastic resin, and as a result, the processing thereof is somewhat different from the processing generally utilized with true thermoplastic resins.

One of the common procedures in forming elements of Teflon is to compress the virgin powder by compaction in a mold to form a mechanically bonded intermediate product identified as a "preform." The preform has a low level of mechanical resistance and may be easily destroyed since the individual particles of powder are held together by mechanical as opposed to chemical forces.

The preform is generally heated in or out of the mold at an elevated temperature for a period of time sufficient to coalesce or bond together the individual compacted particles of Teflon powder into a coherent mass having a shape virtually identical to the shape of the preform. The final shape of the sintered article is determined primarily by the configuration of the mold used in forming the preform.

Sintered polytetrafluoroethylene products exhibit a tendency to cold flow under the application of a deforming load, and the sintered product also has a plastic memory which tends to cause the product to return to its original sintered shape when heated. This characteristic is of importance in designing and in the use of products which have been hot formed subsequent to the sintered operation to alter the configuration thereof. "Hot forming" or other working of the sintered product, as for example by "cold forming" may change the physical shape of the sintered article, but upon exposure to an elevated temperature, the worked sintered product tends to revert or recover, to some extent, to the configuration it had after the sintering operation. The extent to which this reversion of recovery occurs depends in large measure to the temperature to which the worked sintered product is exposed. For example, a part which has been sintered and then hot or cold worked to change its shape may be caused to return to its original sintered shape by heating the part to about 700° F. while the part is unconfined.

Heretofore, it has generally been considered that the tendency of a sintered worked plastic piece to revert to its original shape was a disadvantage which limited the potential application of polytetrafluoroethylene resins, and required arrangements of structural elements designed to maintain the plastic piece confined so as to prevent, as far as possible, reversion attributable to "secondary plastic memory" which results from the hot or cold working occurring after the sintering operation.

Polytetrafluoroethylene, like some other plastic materials is crystalline in nature, and may be oriented by applying to the material, preferably in thin sheets, a tensile stress which brings about an alignment of the crystalline structure, that is, an alteration of the geometrical arrangements of atoms and nature of packing of molecules to form the crystal. The application of tensile stress to bring about orientation is preferably done in the absence of heat, since heating, to some extent, alters the crystallinity. The increased orientation manifests itself by a reduced tendency to deform under the application of a load, and to some extent tends to inhibit the reversion or recovery at an elevated temperature. If the tensile stress results in stretching beyond the elastic limit, the degree and/or extent of recovery is reduced thereby improving to a material degree the stability of the polytetrafluoroethylene element. However, the stresses developed during the application of a tensile force or stress should be removed in order to impart maximum dimensional stability to the piece. This may be done for example by heating the polytetrafluoroethylene piece to a temperature equal or below its transition temperature while maintaining it in a confined condition thereby relieving the stresses without appreciably altering the desirable effects of orientation.

The seal elements to which the present invention relates are primarily used for reciprocating or rotating shafts, for example, fluid pumps, transmission and crankshafts, valve stem seals, or any other arrangement wherein a seal must be established between a movable shaft and a housing.

There are several factors to be considered in seals of this type including for example the radial motion or whip of the shaft and the effects of temperature, particularly in view of the fact that polytetrafluoroethylene resins expand at a rate far greater than most metals, and the fact that the seal is used over a range of temperatures, for example minus 60° F. to plus 350° F.

In the case of seal elements of fluorocarbon resins such as polytetrafluoroethylene some compensation should be made to offset the effects of varying dimensional changes attributable to the difference in coefficient of thermal expansion of polytetrafluorethylene versus steel, for example. It is known, for example, that polytetrafluoroethylene has a coefficient of thermal expansion which is 8 to 10 times larger than the coefficient of expansion of most grades of steel, and while a seal element would appear to perform satisfactorily within a narrow temperature range, serious leakage may occur as the temperature is progressively raised to a point at which the polytetrafluoroethylene has expanded to such dimension that there is no longer tight sealing engagement between the seal element and the shaft, and/or housing.

Heretofore, one procedure which was utilized in the manufacture of a seal assembly of a type similar to that of the present invention involved the operation of forming a hollow cylindrical tube of polytetrafluoroethylene by the steps of compacting and sintering the virgin powder. The inner and outer diameter, as well as the cross-sectional dimension of the hollow cylindrical tube was selected to match closely the ultimate dimensions of the final seal element. In the fabrication of such a hollow cylindrical tube some difficulties may be encountered due to cracking of the preform during the sintering operation resulting in a product which may contain latent flaws rendering portions thereof unuseable for the formation of seal blanks.

The hollow cylindrical tubes were then cut into individual disk-like blanks having a thickness dimension corresponding generally to the desired thickness of the seal element itself. The resulting structure resembled a flat annular washer or gasket which constituted the seal blank, and which was formed either by hot or cold working into the final configuration of the seal element, the seal element in turn being assembled into a supporting structure. Generally, the seal blank was worked to provide a convoluted configuration in which the configuration of the seal surface was established by the cold or hot working operation.

Due to the problems involved in molding large cylindrical tubes from which the individual disks were cut, reliability of the seal elements was reduced, in some instances because of latent imperfections which appeared only after the disks were cut from the cylindrical tube. Additionally, the seal element itself, having been hot or cold worked, possessed a primary memory of its flat unconvoluted or unshaped form, and a secondary memory of the configuration given to it by the hot or cold working technique. Upon exposure to elevated temperatures the seal tended to revert to its planar disk configuration, and the sealing surfaces formed by the hot or cold forming operation became greatly distorted because of high localized heat gradients created by friction and the like.

These undesirable characteristics of seal elements of polytetrafluoroethylene were inherent because of the physical and chemical nature of the plastic as well as the service conditions to which the seal element was exposed. While polytetrafluoroethylene has perhaps the lowest coefficient of friction of any known resin or polymer there still exists in the seal element localized areas of relatively high temperature, particularly along the dynamic working surface. Additionally, the coefficient of thermal expansion of the plastic is significantly higher than that of most metals resulting in increased dimensional instability due to the change in shape attributable to the relatively high coefficient of thermal expansion coupled with the reversion or recovery characteristics of a hot or cold worked polytetrafluoroethylene member.

Accordingly, it is a primary object of the present invention to provide a dimensionally stable seal assembly including a plastic seal element in which the primary memory thereof tends to stabilize the configuration of the seal face.

Another object of the present invention is to provide an improved seal assembly having a seal element of a corrosion resistant plastic material having a low coefficient of friction, and wherein the seal element itself is dimensionally stable.

Another object of the present invention is to provide an improved seal assembly including a supporting element which receives a plastic seal element, wherein the seal surface of the seal element has a primary memory providing temperature stability and a secondary memory which tends to urge the seal element into sealing engagement with a movable or stationary member.

Other objects and advantages of the present invention will be apparent from the following description, the accompanying drawings and the appended claims.

In the drawings:

FIG. 1 is a view in perspective of a seal assembly constructed in accordance with the present invention;

FIG. 2 is a view partly in section and partly in elevation of the seal element shown in FIG. 1;

FIG. 3 is an enlarged fragmentary view partly in section and partly in elevation of the seal elements shown in FIGS. 1 and 2;

FIG. 4 is a schematic view of the mold assembly for forming a seal blank in accordance with the present invention;

FIG. 5 is an enlarged fragmentary view showing the internal configuration of the mold assembly of FIG. 4;

FIG. 6 is an enlarged fragmentary view of the compacted plastic powder within the mold;

FIG. 7 is a fragmentary view of one side of a seal blank in accordance with the present invention;

FIG. 8 is a fragmentary view similar to that of FIG. 7 but of the reverse side of the seal blank;

FIG. 9 is a view in section of the seal blank previously shown in FIGS. 7 and 8;

FIG. 10 is a schematic view of the sequence involved in accordance with the present invention altering the relative position of the seal surface of the seal blank;

FIG. 11 is a view partly in section and partly in elevation of the seal element of the present invention assembled in the supporting structure;

FIG. 12 is a view partly in section and partly in elevation of the seal assembly of the present invention assembled in sealing relation over a shaft; and FIGS. 13–15 are views partly in section and partly in elevation of modified forms of the seal assembly in accordance with the present invention.

Referring to the drawings, which illustrate preferred embodiments of the present invention, a seal assembly 10 shown in FIGS. 1 and 2 includes a generally annular support element 12 including a body member 13 having inner and outer peripheral flanges 14 and 16, respectively. Preferably, the body member 13 and the flanges 14 and 16 are formed as an integral assembly, with flange 14 being so constructed and arranged to define a peripherally extending curved surface whose terminal edge 17 is bent or facing towards flange 16 thereby defining a static seal surface receiving portion 18. The outer peripheral flange 16 is preferably of a dimension, measured axially, which is greater than the axial dimension of the inner peripheral flange 14.

Received in sealing relationship with the support element 12 is a generally annular seat element 20 of a corrosion resistant orientable plastic material having a low coefficient of friction, for example, polytetrafluoroethylene. The seal element includes means forming a static seal surface 21 received in sealing relationship within the static seal receiving portion 18 of the inner peripheral flange 14. The annular seal element 20 also includes means 23 defining a continuous dynamic seal surface positioned radially inwardly of the peripheral flange and adapted to engage the surface of a rotating or reciprocating shaft. Both the dynamic and static seal surfaces are of a predetermined configuration and have a primary memory of this configuration as will be discussed more fully hereinbelow.

Referring to FIG. 3 which shows the seal element in section and on a somewhat enlarged scale, the continuous dynamic seal surface 23 includes a pair of radially inwardly disposed ridges or lips 24 and 26 which are formed integrally with the seal element, and the inside diameter of the seal surface is somewhat less or equal to the diameter of the shaft to be sealed. Provided along the outer periphery, and preferably directly behind the seal surfaces is an annular groove 28 which receives a helically wound endless spring, or garter spring 29 or other resilient member, for urging the seal lips 24 and 26 radially inwardly. Resilient means in the form of a second helically wound endless spring, or garter spring 31 are provided to maintain the static seal surface 21 in sealing relation with the static seal surface receiving portion 18 of the inner peripheral flange.

Each of the seal lips or ridges 24 and 26 is preferably of the same radial dimension so as to provide a pair of axially disposed spaced high pressure seal areas with an intermediate low pressure area formed by an annular groove 32 located between ridges 24 and 26. The seal ridges 24 and 26 are preferably axially spaced from the static seal surface 21 and from the inner peripheral flange 14, and positioned in concentric spaced relation with the outer peripheral flange 16. In the form shown, the diameter of the seal element along the static seal surface 21 is preferably greater than the diameter of the dynamic seal surface 23 so that when assembled within a support housing, or in sealing engagement with a surface, the general configuration of the seal element 10 is preferably frusto-conical, with the outside surface of the cone being defined by the common plane of the dynamic working surface 23 and the static working surface 21.

Axially spaced between the static seal surface 21 and the dynamic seal surface 23 is an intermediate relatively thin unsupported annular section 33 which is preferably integral with the seal surfaces thereby providing a seal element 20 which is substantially continuous and free of radial seams, joints or lips. This intermediate annular section 33 is also spaced axially from the inner peripheral flange 14 thereby providing a flexible unsupported annular band which allows sufficient lateral movement of the dynamic working surface relative to the housing and/or the static seal surface as may be needed to compensate for shaft whip or eccentricity thereof. The radial dimension of the seal element preferably, although not necessarily, decreases progressively from the static to the dynamic seal surface, and the intermediate annular section 33 also serves to allow limited increases in the inside diameter of the dynamic seal surface which is also desirable since it allows use of the seal assembly of the present invention with shafts having a range of diameters falling within limits as determined by the extent to which the dynamic seal surface may increase in diameter without becoming permanently deformed or breaking.

The seal element 20 possesses a primary memory of its convoluted or formed shape, that is to say, the configuration of the dynamic seal surface 23 and particularly the seal ridges or lips 24 and 26 and annular groove 32 are dimensionally stable up to the decomposition temperature of the plastic material because of the processing techniques to be described more fully hereinbelow. That portion of the seal element extending axially beyond the static seal surface 21 in addition to including a primary memory also includes a secondary memory tending to urge the unsupported portion of the seal element extending beyond the inner peripheral flange 14 in a radially inwardly direction independently of the force created by the resilient means 29 received within the annular groove 28.

One of the prime features of the present invention relates to the physical structure of the seal element attributable to both the primary and secondary memory, and to the differential orientation of the seal element which increases from a minimum in the area of the static seal surface to a substantially uniform maximum in the area of the dynamic working surface thereof. This orientation or geometrical arrangement of atoms and molecules forming the crystals of the plastic material operates to increase the tensile strength of the seal element in the areas immediately adjoining and including the dynamic seal surface, while also reducing the tendency of the seal surface to deform under an applied load. Each of these characteristics in addition to the primary and secondary memory imparts a substantially uniform high degree of dimensional stability to that portion of the seal constituting the dynamic working surface.

Procedures by which the seal element of the present invention is formed may be understood with reference to FIGS. 4 through 6 which graphically illustrate the mold configuration and the forming operations involved. The mold 35 includes a hollow cylindrical outer member 36 of bronze or the like which has an outside diameter of approximately three inches. Positioned within the cylindrical member 36 are the hollow cylindrical male and female die portions 38 and 39, respectively, the die portions also being formed of bronze and having an outside diameter of approximately 2½ inches with a small slip clearance between the outside diameter of the die portions and the inside diameter of the outer cylindrical member 36. Positioned within the cylindrical die members is a movable mandrel or plug 40 also of bronze, and having an outside diameter of approximately 1¾ inches and again being proportioned to provide a slip fit with the die members 38 and 29.

The female portion of the die 39 includes one end face 41 which has a series of concentric annular lands and grooves proportioned and arranged to provide the configuration or pattern of convolutions ultimately desired in the seal element. For example, in FIG. 5, the annular V-shaped sections 24a and 26a are proportioned in face 41 to form the ridges or lips 24 and 26, respectively, of the seal element, while land 32a provides the annular groove 32. Spaced radially outwardly of groove 26a is annular land 33a which forms the intermediate annular section 33 of the seal element, with the adjoining groove 21a forming that section of the seal element which corresponds to the static seal surface 21.

The male portion 38 of the mold, which is also a cylindrical tubular element includes an end face 43 which is provided with a plurality of annularly disposed lands and grooves proportioned to form the complementary side of the seal element. Annular land 28a provides the annular groove 28 which receives the resilient member 29, while the adjoining groove 33b forms the outside surface of the outside periphery of the intermediate annular section 33 with the adjoining annular land 21b forming the outer surface of the seal element which is in contact with the resilient member 31.

In the formation of the seal blank, a finely divided polytetrafluoroethylene powder charge is assembled into the mold so that it substantially completely covers all of the lands and grooves of the female portion of the mold. The amount of powder to be used depends on the bulking factor thereof and the thickness dimension of the seal element. The bulking factor of conventional molding powders generally varies from about 4 to 7, thus requiring a compression stroke of 4 to 1 to 7 to 1. After the charge has been placed in the mold, it is compacted by applying to the exposed annular surface of the male portion 38 of the mold a force to create a compacting pressure in an amount between about 8,500 to 11,500 pounds per square inch thus compacting the powdered material to a configuration shown generally in FIG. 6 and providing a preformed article 44 having a configuration as determined by the configuration of the mating surfaces of the mold.

It has been discovered that with polytetrafluoroethylene filled with 10% by weight of graphite, preform pressures in the order of 8,500 to 11,500 pounds per square inch with unheated dies appear to produce a sintered blank having maximum properties with respect to tensile strength and elongation, with a preferred preform pressure being of the order of 9,600 pounds per square inch. With heated dies, and in the case of other fillers, for example, clay, coke flour, asbestos, glass fiber, glass, quartz and talc, the preform pressure may be varied to provide a seal blank having sufficient tensile strength to withstand subsequent working operations. Subsequent to its formation, the preform 44 is removed and heated in an oven at a temperature above its transition temperature, or 621° F. for a period of time sufficient to coalesce the individual particles which have been mechanically compressed during the preforming operation. The sintering operation may continue from one hour to three hours depending on the thickness of the seal blank, and may be done with the preform in or out of the mold as is well known in the art.

The high preform pressures result in a product which has increased tensile strength, a factor which is significant in later processing. Additionally, the high preform pressures operate to maintain the void content of the material less than about 2% with a slightly increase specific gravity and crystallinity over what may be achieved if the void content were higher in percentage. It is known for example that as the void content increases the specific gravity decreases while as crystallinity increases the specific gravity increases. Further, by allowing slow cooling of the product after the sintering operation, there is a tendency for the crystallinity to increase over what it would be if the part were rapidly quenched.

The sintering operation causes the particles to be coalesced to form a seal blank 45 the details of which are shown in FIGS. 7–9. The blank includes a dynamic seal face generally indicated 47 having a configuration controlled by the configuration of the mold in which the preform was formed. Accordingly, it is apparent that various configurations of working faces are possible in accordance with the present invention, and the configuration of the working faces may be varied widely merely by varying the configuration of the mold from which the seal blank was formed.

Disposed immediately above the primary seal face 47 is an annular groove 48 into which a resilient member will ultimately be received in order to urge the seal face 47 into engagement with a rotating or reciprocating shaft. Positioned radially outwardly from groove 48, and in approximately the same plane is a second annular groove 49 which corresponds to the static seal surface 21, and disposed between the two grooves is the intermediate annular portion 51 which connects the dynamic and working surfaces to provide an integrally formed seal blank wherein the various seal surfaces have the predetermined configuration as previously described.

In accordance with the present invention, the dynamic and static working surfaces in the seal blank 45 are preferably disposed in the same plane and radially spaced from each other, although it is possible in accordance with the present invention so to form the seal blank that one of the working surfaces is disposed in a somewhat different plane from the other, as for example working surface 47 facing radially inwardly rather than facing in a vertical plane, or being positioned to face between the vertical and horizontal plane, although such modifications require somewhat complicated mold configurations and somewhat more care during the molding operation.

Following the formation of the seal blank, the remaining operation involved in forming the seal element, in accordance with the present invention, is to position the dynamic and working surfaces in the final ultimate position they will occupy in the finished seal element. The procedure for accomplishing this relative change in location of working surfaces may be understood with reference to FIG. 10 which shows a mandrel 55 including a cylindrical section 56 which is in direct communication with a tapered or frusto-conical portion 57. The diameter of the mandrel at end 58 is preferably equal to or slightly less than the inner diameter of the seal blank so that the blank may be assembled thereover. The tapered surface 57 of the mandrel 55 increases in diameter to a diameter at the cylindrical section 56 which is approximately equal to or slightly less than the diameter of the shaft which is to be sealed, and preferably equal in diameter to the outside daimeter of the seal blank.

The seal blank 45 which is preferably at room temperature is assembled over the preferably untreated mandrel 55 with its face 47 as shown in position $a$ in facing relation with the cylindrical section, that is, the blank is so assembled on the mandrel that upon further movement over the tapered portion of the mandrel, working surface 47 will engage the outer surface of the mandrel. The blank 45 is then advanced over the mandrel until it assumes position $b$ at which point the inside diameter of the seal blank has been enlarged and the working face 47 has been partially rotated through an angle. In this position on the mandrel, a tensile stress has been applied to the plastic tending to orient the plastic material while simultaneously altering the position of the seal face 47 from a generally horizontal plane to a plane intermediate the horizontal and the vertical. In effect the rotation and increase in inside diameter of the seal blank is a cold working process of the plastic. As the seal blank is advanced further to position $c$, the location of the seal face 47 has been altered 90° from the horizontal to the vertical so that the seal face 47 of the seal blank now lies in a plane identical to the plane of working face 23 of the seal element 20. In accordance with the present invention it is also possible to position the seal face at a plane between the vertical and horizontal, in which case the seal face would be rotated through an angle less than 90° and roughly to a position shown at $b$ in FIG. 10. The seal is then moved to the cylindrical section 56 of the mandrel or to a position shown at $d$ at which time the change in relative position of the seal face is complete. More than one seal element may be assembled over the mandrel and moved along the cylindrical surface and the cylindrical section 56 on the mandrel may be of sufficient length to hold 50 to 100 seal elements.

The increase in diameter of the seal blank from position $a$ to position $d$, as was previously mentioned, operates to orient the plastic material, that is increase its resistance to deformation under load and increase its apparent tensile strength while at the same time altering the relative position of the working face.

The maximum effects of the application of tensile stress are most pronounced in the areas immediately adjacent to the dynamic working face 47, which corresponds to working face 23 of seal element 20, and there is a differential orientation which is a maximum at the inner peripheral edge 59, as shown in FIGS. 9 and 10 and decreasing to a minimum at the intermediate section 51. The dimensions of the mandrel and the dimensions of the seal blank are preferably so coordinated and correlated as to stretch the seal blank in the area immediately adjacent the dynamic working face beyond the theoretical elastic limit, that is, the limit at which the elastic response begins to deviate from linearity at only a few percentages of strain. It is for this reason that the forming techniques for the seal blank are coordinated and correlated with the particular starting material from which the blank is fabricated in order to provide a seal blank which will maintain its integrity during the stretching operation. The high compacting pressures also provide the other advantages previously noted.

It is also possible in accordance with the present invention to assemble the seal blank in a supporting element, for example that shown in FIGS. 1, 2 and 3, while at the same time positioning the garter springs thereover followed by assembly of the seal blank and supporting element over the mandrel so that the seal blank assumes a position generally shown in d of FIG. 10. In this instance, the working face is likewise rotated through an angle and stretched as previously described. The dimensions of the mandrel, seal blank and supporting structure are coordinated and correlated to allow assembly of the composite over the mandrel and to effect stretching and provide a seal element of proper inside diameter for a shaft.

Once located in position d as shown in FIG. 10, the seal blank 45, or the seal blank assembled in its supporting structure is heated to a temperature in the order of the transition temperature of polytetrafluoroethylene for a period of time to bring about substantially permanent set of the plastic. Thus assembled over the mandrel, the seal blank is in a confined condition whether it is assembled in the supporting structure or merely positioned over the mandrel. By heating the thus confined seal blank, the tensional stresses are relieved without materially reducing the effects of orientation. The heating operation to relieve the stresses may cause some slight deformation of the dynamic working face, but this is not a permanent deformation because the working face has a primary memory of its predetermined sintered configuration, and onceexposed to a temperature in the order of 700° F. while the working face only is in an unconfined condition, it will return to its predetermined configuration.

By heat setting the seal blank to form the seal element tending to cause it to return to its predetermined configuration or to its planar shape as shown in FIGS. 7-9 without any deleterious change in the configuration of the respective seal faces. The advantage which accrues is that temperature and dimensional stability is provided since increase in temperature causes the dynamic working face to engage the shaft more tightly without altering the configuration of the working face, whatever it might be.

Following the heat setting operation, the seal element is removed from the mandrel and assembled into a supporting structure, if that has not already been done, and the resulting structure is similar to that in FIGS. 1 to 3 and shown also in FIG. 11 wherein like reference numerals have been employed. The normal inside diameter D1 as measured in the area of the dynamic working face 23 is preferably somewhat less than the diameter D2 of the shaft to be sealed when the seal assembly is positioned in its supporting structure and in the absence of a shaft. When the shaft is inserted, the diameter of the working face is increased slightly to effect sealing engagement between the dynamic working surface and the outer working surface of the shaft as shown for example in FIG. 12. One of the advantages of the seal structure in accordance with the present invention is the fact that one seal element may be used for shafts of various diameter, for example, the same seal element having a normal inside diameter of 1¹⁵⁄₁₆ inches could be used to seal a shaft varying in diameter from 1¹⁵⁄₁₆ inches up to about 2¹⁄₁₅ inches in diameter, with corresponding variances being provided for in the seals of smaller size, which may be as small as ⁵⁄₁₆ inch in normal inside diameter, for example.

Referring to FIG. 12, the seal assembly 10 is shown as mounted in a support housing 60 which is provided with an annular pocket 61 to receive the seal element 10. The housing 60 also includes an aperture 63 for passage of a reciprocating or rotating shaft 64 and means, not shown, are provided for effecting a seal between the seal assembly 10 and the housing 60. The seal between the shaft 64 and the seal element 20 is effected by the dynamic seal surface 23 which includes the plurality radially inwardly disposed spaced ridges or lips 24 and 26 providing spaced high pressure seal areas in contact with the shaft and urged into engagement therewith by the helical spring 29. Sealing engagement is enhanced by fluid or gaseous pressure which works against the back face 65 of the seal member tending to urge the seal lips more tightly into engagement with the shaft.

As pointed out previously, the intermediate annular section 33 is unsupported and allows a movement of the dynamic working face 20 with respect to the static working face 21 thus compensating for shaft whip or slight eccentricities of the shaft during its rotating or reciprocating movement. Additionally, the seal element itself is relatively thin, in the order of .005 to .025 of an inch, and in this range of thickness, the seal element possesses improved heat dissipating characteristics while providing efficient sealing.

During movement of the shaft, there is relatively high localized heating in the area of the dynamic working face which tends to cause the seal element 20 to revert to its original sintered shape, shown in FIGS. 7, 8 and 9 thereby urging the dynamic working face more tightly into engagement with the shaft as the temperature increases. This is desirable in view of the difference in coefficient of thermal expansion of the seal element and of the metal constituting the shaft and the support housing 12 which tends to cause leaky seals unless provision is made to compensate for the changes in dimension attributable to increasing temperature. The secondary memory of the plastic material which results from the processing thereof tends to urge the dynamic seal surface towards the shaft, and the fact that the dynamic working surface is more oriented than the remaining portions of the seal element coupled with the stretching beyond the theoretical elastic limit during cold working operate to increase substantially the resistance to deformation under load and the tensile strength of the seal element in this particular area. The net effect is that the seal is stable dimensionally, and if any distortion is to take place it takes place in a direction which effects sealing rather than bringing about leakage. Additionally, the increased tensile strength provides somewhat improved performance with respect to shaft whipping and flexing of the seal element in the event there is any shaft whip or an eccentric shaft.

As the temperature increases during rotating or reciprocating movement of the shaft there is a tendency for polytetrafluoroethylene materials to revert to their sintered configuration so that seal elements wherein the configuration of the dynamic seal surface have been hot formed show a tendency to revert to their planar nonconvoluted shape even though the increase in temperature may also cause the seal element to engage the shaft more tightly. Accordingly, increase in temperature brings about two simultaneous effects, the desirable effect of tending to urge the seal surface into engagement with the shaft and the undesirable effect of tending to distort the basic configuration of the seal surface. The net effect is subtractive rather than additive in that the polytetrafluoroethylene attempts to and does in fact recover or revert to its original sintered and planar shape, if the seal lips were formed by hot or cold working. This alteration of seal surface configuration may be substantial at elevated temperatures and becomes progressively worse as the temperature increases further thereby substantially reducing the sealing efficiency of the high pressure, seal areas, while at the same time only slightly increasing the sealing efficiency by the radially inward movement of the dynamic seal face as previously described.

In the case of the present invention, however, the configuration of the dynamic working surface is stable up to the temperature of decomposition of the plastic material because this configuration was produced by a sintering operation which develops a primary memory as opposed to a hot or cold working operation which only develops a secondary memory and which can be overcome by sufficiently high temperatures. In the seal of the present invention the desirable effects of secondary memory are not offset by basic changes in the configuration of the dynamic working surface, and thus the net effect of an increase in temperature is to cause the sealing lips to move towards the shaft without causing a simultaneous change in the seal lip configuration.

In a case wherein the temperature of the seal element drops, for example, when the shaft is not moving, or in cold weather operation, the seal element of the present invention remains in tight sealing engagement with the shaft because the configuration of the high pressure seal surface area is stable. As the temperature of the seal element drops, the radial dimension thereof tends to decrease at a rate greater than that of the metallic shaft because of the differences in coefficient of thermal expansion, and the high pressure seal face tends to move more tightly in sealing engagement with the shaft. At the same time that the radial dimension of the shaft decreases, there is also a tendency for the dynamic working face to move away from the shaft and to a position which has previously been described as its normal inside diameter, which in dimension is approximately the same as the diameter of the shaft at room temperature. The net effect of the change in radial dimensions is that it corrects for changes in the position of the dynamic working face, whose position relative to the shaft is controlled by coordinating and correlating the cylindrical diameter of the mandrel and the inside diameter of the seal element itself. Thus, the seal element of the present invention does not exhibit any tendency to turn back on itself or move out of contact with the shaft even at relatively low temperatures. A hot formed seal element on the other hand will expand in diameter upon heating and turn inwardly while at the same time changing the configuration of the dynamic working face or the high pressure seal surface. As the temperature drops, the radial dimensions of the seal element will decrease and the deformed or distorted high pressure seal face will come into contact with the shaft and this may give rise to seals which leak after temperature cycling from a high temperature to a low temperature, as frequently occur during motor operation in relatively cold weather.

In some applications, it may be desirable to provide one as opposed to a plurality of high pressure sealing lips as shown for example in FIG. 13 wherein like reference numerals have been employed wherever possible. The support housing 12 is the same as previously described, as is the seal element 20 except that the dynamic seal surface 23 includes only a single high pressure sealing ridge 66 as opposed to a plurality of high pressure sealing lips 24 and 26 as shown in the previous constructions.

It is also possible in accordance with the present invention to cement or substantially permanently fix the static seal surface 21 to the inner peripheral flange 14 by an adhesive composition 68 interposed between the mating surfaces. Any of the adhesives commonly used with polytetrafluoroethylene may be employed as is well known in the art. In the construction shown in FIG. 14 resilient means in the form of a garter spring or the like, not shown, may also be utilized as previously described.

In lieu of the garter spring, it is possible to utilize an elastomeric material 70 as shown in FIG. 15 which substantially completely surrounds the seal element forcing it radially inwardly. Elastomers may be used in instances where the seal is not exposed to relatively high temperatures, and represents an alternate manner of forcing the dynamic and static seal surfaces into sealing engagement with the corresponding mating surfaces. If desired, separate resilient elastomeric bands may be used as opposed to the unitary band structure shown in FIG. 15.

The seal element and seal assembly in accordance with the present invention offers the desirable advantages of being relatively inexpensive to manufacture and at the same time providing temperature stability over a substantial range of temperatures because of the memory thereof while having increased resistance to deformation under load due to the orientation of the fluorocarbon plastic material constituting the seal element.

While the forms of apparatus herein described constitute preferred embodiments of the invention, it is to be understood that the invention is not limited to these precise forms of apparatus and that changes may be made therein without departing from the scope of the invention.

What is claimed is:

1. A seal assembly for sealing relatively movable members comprising, an annular support housing, a generally annular seal element received in said housing, said annular seal element being of polytetrafluoroethylene, said annular seal element including means defining a static and a dynamic seal surface, said dynamic seal surface being of predetermined configuration for forming a continuous high pressure seal area and having a plastic memory of its predetermined configuration and a secondary plastic memory, said primary plastic memory operating to decrease the deformation of said seal surface upon increase in temperature thereof, and said secondary plastic memory operating to urge said seal surface more tightly into sealing engagemnt upon increase in the temperature thereof.

2. A seal assembly as set forth in claim 1 wherein said annular seal element includes an annular body portion, and said dynamic seal surface being oriented to a degree greater than said body portion for decreasing deformation under load of said seal element in the areas thereof immediately adjacent to and including said dynamic seal surface.

3. A seal assembly as set forth in claim 1 wherein said support housing includes body means having an inner peripheral flange, a generally annular seal element including a body member, a dynamic working surface and a static working surface, said static seal surface being received in sealing relationship with said inner peripheral flange, and said dynamic working surface being disposed in axial spaced relationship with said static working surface.

4. A seal assembly as set forth in claim 3 wherein said static sealing surface is bonded to said inner peripheral flange.

5. A seal assembly as set forth in claim 1 wherein said annular support housing includes body means and inner and outer peripheral flanges, said inner peripheral flange defining an annular static working surface receiving seat, said annular seal element including a dynamic working face and a static working face spaced by an annular intermediate section, said static working surface being received within said annular seat, means maintaining said static working surface in sealed relation with said seat, and means maintaining said high pressure seal area in sealing engagement with one of said relatively movable members.

6. A seal assembly as set forth in claim 5 wherein said inner and outer peripheral flanges are concentrically arranged, said dynamic seal surface positioned radially inward of said inner peripheral flange, and means urging said dynamic seal surface into sealing engagement with another surface.

7. A seal assembly as set forth in claim 1 wherein said annular support housing includes body means, said annular seal element received in sealing relation with said body means, said annular seal element including means defining a continuous dynamic seal surface and a static seal surface, the radial dimension of said dynamic seal surface being less than that of said static seal surface, polytetrafluoroethylene material integral with and interconnecting said seal surfaces and having a radial dimension intermediate the dimension of said seal surfaces, said integral polytetrafluoroethylene material being unsupported for allowing lateral movement of one of said surfaces relative to the other, and means urging said dynamic seal surface into sealing engagement with another surface.

8. A seal assembly as set forth in claim 1 wherein said polytetrafluoroethylene contains a filler.

9. A seal assembly as set forth in claim 1 wherein said seal element includes a static seal surface spaced from said dynamic seal surface, said sealing surfaces being joined by an intermediate relatively thin annular section, and said dynamic and static seal surfaces being integral with said intermediate annular section.

10. A seal assembly as set forth in claim 1 wherein said seal element includes a static seal surface, and said dynamic seal surface being in a plane different from the plane of said static seal surface.

References Cited

UNITED STATES PATENTS

| | | | |
|---|---|---|---|
| 2,927,808 | 3/1960 | Rosenberger | 277—153 |
| 3,188,098 | 6/1965 | Skinner | 277—153 |
| 3,210,086 | 10/1965 | Hudson et al. | 277—153 X |
| 3,261,374 | 7/1966 | Anderson et al. | 138—97 |

FOREIGN PATENTS 839,651  5/1952  Germany.

LAVERNE D. GEIGER, *Primary Examiner.*

J. S. MEDNICK, *Assistant Examiner.*

U.S. Cl. X.R.

264—119; 277—235

PO-1050
(5/69)

UNITED STATES PATENT OFFICE
CERTIFICATE OF CORRECTION

Patent No. 3,443,817                 Dated    May 13, 1969

Inventor(s)   Victor G. Reiling

It is certified that error appears in the above-identified patent and that said Letters Patent are hereby corrected as shown below:

Column 9, line 29, following "ment" insert --20, a secondary memory is imparted to the seal element--.

SIGNED AND
SEALED

AUG 26 1969

(SEAL)
Attest:

Edward M. Fletcher, Jr.
Attesting Officer

WILLIAM E. SCHUYLER, JR.
Commissioner of Patents